(12) United States Patent
Kofinas et al.

(10) Patent No.: US 9,252,456 B2
(45) Date of Patent: Feb. 2, 2016

(54) POLYMER SOLID ELECTROLYTE FOR FLEXIBLE BATTERIES

(75) Inventors: Peter Kofinas, North Bethesda, MD (US); Ayan Ghosh, Hyattsville, MD (US)

(73) Assignee: University of Maryland, College Park, College Park, MD (US)

( * ) Notice: Subject to any disclaimer, the term of this patent is extended or adjusted under 35 U.S.C. 154(b) by 1320 days.

(21) Appl. No.: 12/715,178

(22) Filed: Mar. 1, 2010

(65) Prior Publication Data

US 2010/0255383 A1 Oct. 7, 2010

Related U.S. Application Data

(60) Provisional application No. 61/156,267, filed on Feb. 27, 2009.

(51) Int. Cl.
*H01M 6/18* (2006.01)
*H01M 10/0565* (2010.01)
*C08J 5/22* (2006.01)

(52) U.S. Cl.
CPC .......... *H01M 10/0565* (2013.01); *C08J 5/2268* (2013.01); *H01M 6/181* (2013.01); *H01M 6/188* (2013.01); *C08J 2335/02* (2013.01); *C08J 2371/12* (2013.01); *H01M 2300/0082* (2013.01)

(58) Field of Classification Search
None
See application file for complete search history.

(56) References Cited

U.S. PATENT DOCUMENTS

| 6,991,741 | B2 | 1/2006 | Bullock et al. |
| 7,063,918 | B2 | 6/2006 | Kofinas et al. |
| 2008/0241185 | A1 | 10/2008 | Kofinas et al. |
| 2009/0162754 | A1 | 6/2009 | Cotton et al. |

OTHER PUBLICATIONS

Smart et al. eds., Rechargeable Lithium and Lithium Ion Batteries, 11 (29) ECS Transactions 131-37 (2008, publishing the papers presented at the symposium "Rechargeable Lithium and Lithium Ion Batteries," held in Washington DC on Oct. 2007).*
Peter Kofinas Paper From academia.edu (A Ghosh et al, PEO Based Block Copolymer as Solid State Lithium Battery Electrode, 11 ECS Transactions (29) 131-137 (2008, which accoding to Peter Kofinas at Academia.edu was published Jan. 1, 2008).*
Ghosh, A., and Kofinas, P., "Nanostructured Block Copolymer Dry Electrolyte," *Journal of the Electrochemical Society* 155:A428-A431, The Electrochemical Society, United States (2008).
Wang, S., et al., "Properties of Lithium bis(oxatlato)borate (LiBOB) as a Lithium Salt and Cycle Performance in $LiMn_2O_4$ Half Cell," *Int. J. Electrochem. Sci.* 1:250-257, Electrochemical Science Group, Serbia (2006).

* cited by examiner

*Primary Examiner* — Yoshitoshi Takeuchi
(74) *Attorney, Agent, or Firm* — Sterne, Kessler, Goldstein & Fox PLLC (57) ABSTRACT

A flexible polymer solid electrolyte material useful in battery technology is described. The flexible solid electrolyte comprises a first block that has the ability to solvate alkali metal salts. The flexible solid electrolyte comprises a second block that has the ability to incorporate lithium ions within microphase separated spherical domains, wherein the lithium ions are from a secondary lithium source. The flexible solid electrolyte further comprises a second lithium salt.

13 Claims, 6 Drawing Sheets

POLYMER SOLID ELECTROLYTE FOR FLEXIBLE BATTERIES

STATEMENT REGARDING FEDERALLY SPONSORED RESEARCH AND DEVELOPMENT

This invention was made with government support under grant award number CBET0728975 awarded by the National Science Foundation. The government has certain rights in the invention.

BACKGROUND OF THE INVENTION

1. Field of the Invention

The invention describes a flexible polymer solid electrolyte that is useful in battery technology. The flexible polymer solid electrolyte comprises a first block, a second block comprising a polymer that incorporates ions of a first lithium salt within the microphase separated spherical domains of the polymer, and a second lithium salt.

2. Related Art

In recent years, interest in polymeric batteries has increased dramatically. Current configurations have a liquid or gel electrolyte along with a separator between the anode and cathode. This leads to problems with electrolyte loss and decreased performance over time. The highly reactive nature of such electrolytes necessitates the use of protective enclosures, which add to the size and bulk of the battery.

Polymer electrolytes are more compliant than conventional glass or ceramic electrolytes. Lightweight, shape-conforming, polymer electrolyte-based battery systems could find widespread application as energy sources in miniature medical devices such as pacemakers, wireless endoscopes, implantable pumps, treatment probes, and untethered robotic mobile manipulators.

The complex forming capability of poly(ethylene oxide) (PEO) with alkali metal salts, introduced by Fenton et al., *Polymer* 14:589 (1973), has been the starting point for an abundance of published work on polymer electrolytes for use in batteries. A semicrystalline polymer, PEO, has been a focal component in the design of numerous dry, solvent-free electrolytes involving blends (see Rajendran et al., *J. Solid State Electrochem.* 6:560 (2002)), block copolymers (see Gray et al., *Macromolecules* 21:392 (1988), Harris et al., *Macromolecules* 35:3772 (2002), Ryu et al., *J. Electrochem. Soc.* 152: A158 (2005), and Singh et al., *Macromolecules* 40:4578 (2007)), branched networks (see Kim et al., *Polym. Eng. Sci.* 34:1305 (1994)), ceramic fillers (see Croce et al., *Nature* 394:456 (1998), Croce et al., *Electrochim. Acta* 46:2457 (2001), Croce et al., *J. Power Sources* 162:685 (2006), and Kurian et al., *Electrochim. Acta* 50:2125 (2005)), room-temperature ionic liquids (see Seki et al., *J. Phys. Chem. B* 110: 10228 (2006) and Shin et al., *Electrochem. Commun.* 5:1016 (2003)), and specialized salts (see Borghini et al., *J. Electrochem. Soc.* 142:2118 (1995) and Appetecchi et al., *J. Electrochem. Soc.* 148:A1171 (2001)). It is important to carefully tailor the polymer electrolyte matrix to attain appreciable levels of conductivity in a solid-state medium.

Thus, there is a need for a solid electrolyte that exhibits high ion transport at room temperature compared to traditional solid polymer electrolytes.

BRIEF SUMMARY OF THE INVENTION

One aspect of the invention is to provide a flexible solid polymer electrolyte useful in a battery, the solid polymer electrolyte including a first polymer capable of solvating a second lithium salt, a second polymer that has the ability to incorporate lithium ions from a first lithium salt within microphase separated spherical domains, a first lithium salt, and a second lithium salt.

In one embodiment, the invention provides a solid polymer electrolyte comprising a) a lithium salt of a diblock copolymer wherein the diblock copolymer comprises a polyether block and an acrylate block; and b) a second lithium salt.

In one embodiment, the invention provides a solid polymer electrolyte, wherein the polyether block is polyethylene oxide.

In one embodiment, the invention provides a solid polymer electrolyte, wherein the acrylate block is methylmethacrylate.

In one embodiment, the invention provides a solid polymer electrolyte, wherein the solid polymer electrolyte has reduced crystallinity compared to PEO of similar molecular weight.

In one embodiment, the invention provides a solid polymer electrolyte, wherein the acrylate block is a random copolymer.

In one embodiment, the invention provides a solid polymer electrolyte, wherein the diblock copolymer is a PEO-b-PMMA block copolymer.

In one embodiment, the invention provides a solid polymer electrolyte, wherein the molecular weight ratio of PEO to PMMA is between about 4:1 to about 10:1.

In one embodiment, the invention provides a solid polymer electrolyte, wherein the lithium salt of a diblock copolymer is a lithium salt of an acrylic acid.

In one embodiment, the invention provides a solid polymer electrolyte, wherein the lithium salt of a diblock copolymer is a lithium salt of methacrylic acid.

In one embodiment, the invention provides a solid polymer electrolyte, wherein the diblock copolymer is PEO-b-(PMMA-ran-PMAALi).

In one embodiment, the invention provides a solid polymer electrolyte, wherein the second lithium salt is selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, and lithium bis(oxalato)borate.

In one embodiment, the invention provides a solid polymer electrolyte, wherein the second lithium salt is lithium bis(oxalato)borate.

In one embodiment, the invention provide a solid polymer electrolyte, wherein the ratio of the diblock copolymer to the second lithium salt is between about 65% to about 95% ethylene oxide unit to between about 35% to about 5% second lithium salt.

In one embodiment, the invention provides a solid polymer electrolyte, wherein the ratio of the diblock copolymer to the second lithium salt is about 75% ethylene oxide unit to about 25% second lithium salt.

In one embodiment, the invention provides a solid polymer electrolyte, wherein the ratio of the diblock copolymer to the second lithium salt is about 80% ethylene oxide unit to about 20% second lithium salt.

In one embodiment, the invention provides a solid polymer electrolyte, wherein the lithium ions of the lithium salt of the diblock copolymer are incorporated within the microphase separated spherical domains of the acrylate block.

In one embodiment, the invention provides a solid polymer electrolyte, comprising a polyethylene oxide polymer block, a methylmethacrylate polymer block comprising a lithium salt of methacrylic acid, and lithium bis(oxalato)borate.

In one embodiment, the invention provides a battery comprising the solid polymer electrolyte of the invention.

In one embodiment, the invention provides a method of producing a solid polymer electrolyte comprising:

a) hydrolyzing a solution of a diblock copolymer comprising a polyether block and an acrylate ester block, with lithium hydroxide in an organic solvent to give a diblock copolymer salt;

b) drying the diblock copolymer salt produced by a); and c) dissolving said diblock copolymer salt in an organic solvent and adding a second lithium salt to give a polymer solution.

In one embodiment, the invention provides a method of producing a solid polymer electrolyte, wherein the solution is a) is produced by adding a mixture of 1,4-dioxane and methanol.

In one embodiment, the invention provides a method of producing a solid polymer electrolyte, further comprising:

d) casting the polymer solution of c) into an apparatus containing a substrate; and e) drying the polymer solution to produce a polymer electrolyte film.

Another aspect of the invention is to provide a flexible solid polymer electrolyte for a battery that exhibits minimal capacity fade over 500 cycles and has longer performance life than conventional inorganic glass or ceramic electrolytes.

DETAILED DESCRIPTION OF THE INVENTION

The flexible polymer solid electrolyte comprises a first polymer block, a second polymer block comprising a polymer that incorporates ions of a first lithium salt within the microphase separated spherical domains of the polymer, and a second lithium salt.

Figure 1:
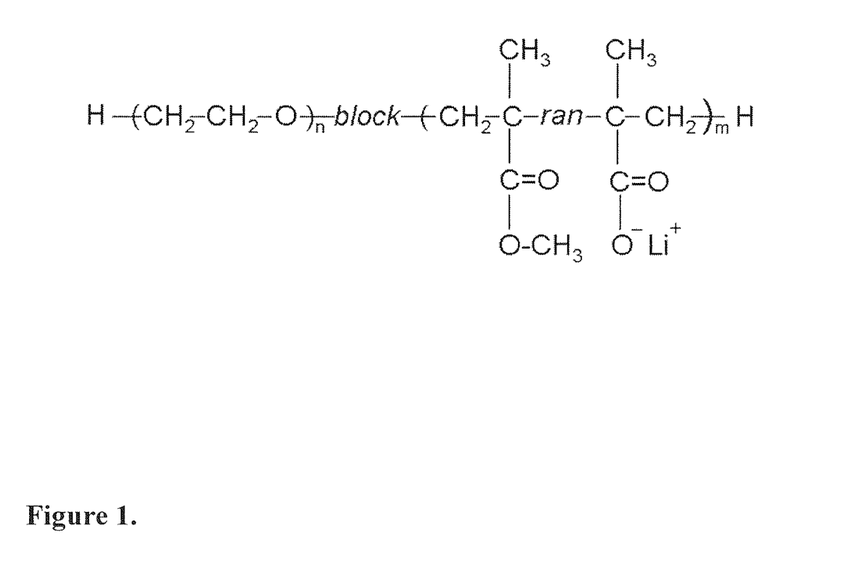
FIG. 1 is a depiction of the chemical structure of a self-assembled diblock copolymer.
Figure 2:
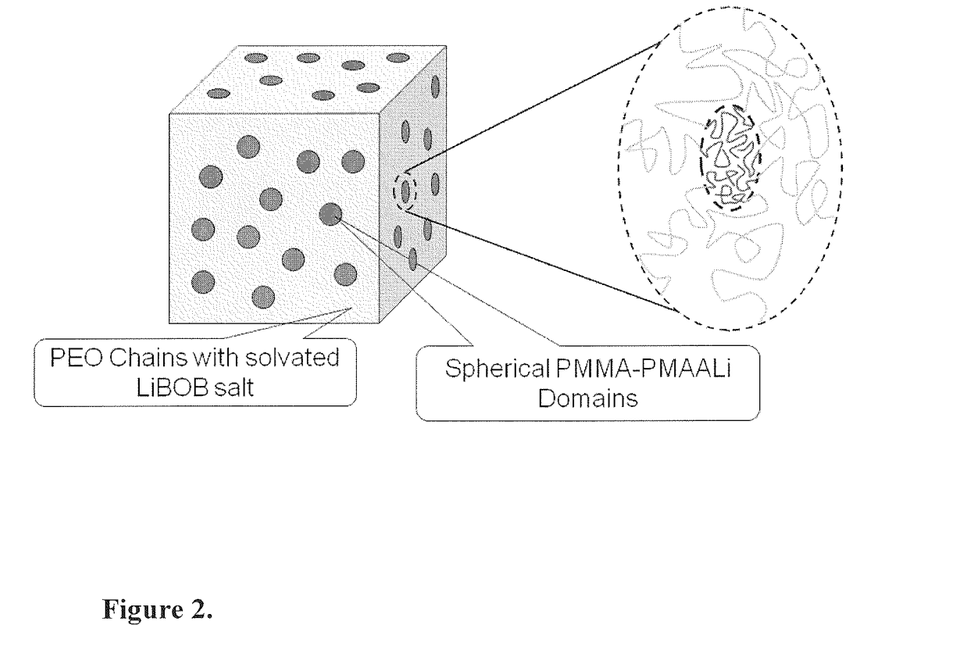
FIG. 2 is a schematic representation of the diblock copolymer electrolyte morphology.

The flexible solid polymer of the present invention is composed of at least two polymer blocks. The first polymer block has the ability to solvate alkali metal salts as illustrated in FIG. 2. The first polymer contains a polymer of the polyether family such as polyethylene oxide (PEO), polypropylene oxide (PPO), polybutylene oxide (PBO) and copolymers comprising one or more of these polymers. In one embodiment, the first polymer is a PEO-based polymer or copolymer.

The molecular weight of the first polymer is chosen based on the nature and state, desired performance, and other components of the polymer electrolyte. In one embodiment, the first polymer has a molecular weight between 2,000 and 250,000. In another embodiment, the first polymer has a molecular weight between 2,000 and 5,000. In another embodiment, the first polymer is PEO with a molecular weight of about 3,000.

PEO is able to form stable complexes with lithium salts and has a high conductivity compared to other solvating polymers in the absence of organic solvents. However, polyethylene oxide crystallizes at temperatures below 65° C. and the low mobility of PEO in the crystalline phase results in unacceptable ionic conductivities at room temperature. In order to suppress PEO crystallinity and to enhance its conductivity, a low-molecular-weight block copolymer can be used.

The second polymer block has the ability to incorporate lithium ions within the microphase separated spherical domains. The lithium ions that are incorporated within the microphase separated spherical domains create a secondary lithium ion source as illustrated in FIG. 2.

In one embodiment, the second polymer is an alkyl acrylate such as methyl acrylate (or methacrylate), ethyl acrylate (or methacrylate), n-propyl acrylate, n-butyl acrylate, 2-ethylhexyl acrylate (or methacrylate), or stearyl acrylate (or methacrylate). In one embodiment, the second polymer is polymethylmethacrylate (PMMA). In another embodiment the second polymer is a random copolymer of methylmethacrylate (MMA).

The molecular weight of the second polymer is chosen based on the nature and state, desired performance, and other components of the polymer electrolyte. In one embodiment, the second polymer has a molecular weight between 400 and 50,000. In another embodiment, the second polymer has a molecular weight between 400 and 2,000.

In another embodiment, the second polymer is PMMA with a molecular weight of about 500.

The term "about" as used herein includes the recited number+10%. Thus, "about ten" means 9 to 11.

In one embodiment, the molecular weight ratio of the first polymer to the second polymer is about 10:1, 9:1, 8:1, 7:1, 6:1, 5:1, 4:1, 3:1, 2:1, or 1:1. In another embodiment the first polymer is PEO and the second polymer is PMMA with a molecular weight ratio of about 10:1, 9:1, 8:1, 7:1, 6:1, 5:1, 4:1, 3:1, 2:1, or 1:1. In another embodiment the first polymer is PEO and the second polymer is PMMA with a molecular weight ratio of about 6:1. In another embodiment, the copolymer is a PEO-b-PMMA block copolymer with an average molecular weight ratio of 3000:500 (PEO:PMMA) and a polydispersity index of 1.16.

The solid polymer electrolyte can be produced by hydrolysis of a copolymer of the first and second block with a first lithium salt in a solvent mixture. The solvent is evaporated to produce a dried diblock copolymer. The second polymer block incorporates the lithium ions within the microphase separated spherical domains of the diblock copolymer (see FIG. 2) and creates a secondary ion source.

The first lithium salt is capable of being incorporated into the second polymer block and produce microphase separated spherical domains. The first lithium salt of the present invention comprises lithium and at least one acrylic acid comprising between 1 and 4 carbon atoms. In one embodiment the first lithium salt is a lithium salt of methacrylic acid (MAALi).

During hydrolysis of the copolymer of the first and second block with the first lithium salt, the temperature may be between 50° C. to 120° C. In one embodiment, the temperature is about 85° C. during hydrolysis. For the hydrolysis reaction, the solvent is selected from the group consisting of N-N-dimethylformamide, N,N-dimethylacetamide, N-methyl-2-pyrrolidone, dimethylsulfoxide, 1,4-dioxane, and methanol, wherein the solvent is anhydrous. In one embodiment, the solvent is a mixture of 1,4-dioxane and methanol. In another embodiment, the solvent is an about 2:1 mixture of 1,4-dioxane and methanol.

In evaporating the solvent, the temperature may be between the freezing point of the solvent and a temperature that is 50° C. higher than the boiling point of the solvent. In one embodiment, the solvent is evaporated at room temperature. In another embodiment, the solvent is evaporated under vacuum.

In one embodiment the first polymer block, second polymer block, and first lithium salt is the diblock copolymer PEO-b-(PMMA-ran-PMAALi). A random copolymer of methylmethacrylate and a first lithium salt of methacrylic acid has the ability to incorporate the lithium ions within the microphase separated spherical domains of the diblock copolymer PEO-b-(PMMA-ran-PMAALi), creating a secondary lithium source.

Solid electrolyte films can be produced by adding a second lithium salt to the dried diblock copolymer in solvent to form a polymer solution. In one embodiment, the solvent is an anhydrous solvent selected from tetrahydrofuran (THF), 2-methyl-tetrahydrofuran, 1,3-dioxoran, 4,4-dimethyl-1,3-dioxane, γ-butyrolactone, ethylene carbonate, propylene carbonate, butylene carbonate, sulfolane, 3-methyl sulfolane, tert-butyl ether, iso-butyl ether, 1,2-dimethoxy ethane, 1,2-ethoxy methoxy ethane, methyl diglyme, methyl triglyme, methyl tetraglyme, ethyl glyme, ethyl diglyme, or a mixture thereof. In one embodiment, the solvent is anhydrous THF.

It is important to use the appropriate second lithium salt concentration in order to obtain an optimum performance from the electrolyte. An ideal electrolyte is a medium that is rich in charge carriers and provides for a rapid transport of charge carriers through it. Too little salt results in poor conductivity. Too much salt not only severely affects the mechanical properties of the polymer, thus negating its inherent advantages, but also results in decreased conductivity.

The flexibility of the polymer films is related to the segmental motion of the chains and hence is a characteristic that can be associated with the conductivity potential of the electrolyte. The greater the crystallinity of a polymer electrolyte, the lower the segmental motion of the chains and therefore, the lower the flexiblity of the polymer electrolyte. Differential scanning calorimetry (DSC) can be used to compare the crystallinity content in polymer electrolytes.

Polymer solutions can be prepared by mixing the dried diblock copolymer in solution with a second lithium salt. In one embodiment the dried diblock copolymer and second lithium salt are mixed in a ratio of between about 65% and 95% ethylene oxide unit to between about 35% to 5% second lithium salt. In another embodiment, the dried diblock copolymer and second lithium salt are mixed in a ratio of between about 75% and 80% ethylene oxide unit to between about 25% to 20% second lithium salt. In another embodiment, the dried diblock copolymer and second lithium salt are mixed in a ratio of about 75% ethylene oxide unit to about 25% second lithium salt. In another embodiment, the dried diblock copolymer and second lithium salt are mixed in a ratio of about 80% ethylene oxide unit to about 20% second lithium salt.

In one embodiment the second lithium salt is a high molecular weight lithium salt.

In one embodiment, the second lithium salt is selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, and $LiN(C_pF_{2p+1}SO_2)(C_qF_{2q+1}SO_2)$ (p and q are natural numbers), LiCl and LiI. In another embodiment, the second lithium salt is a lithium fluoroalkyl phosphate of the formula:

$$Li^+[PF_x(C_yF_{2y+1-z}H_z)_{6-x}]^-$$

wherein:
x is 1-5;
y is 3-8; and
z is 0-(2y+1).

In another embodiment, the second lithium salt is lithium bis(oxalato)borate (LiBOB).

LiBOB meets the basic requirements for a salt to be used in lithium-ion cells: acceptable conductivity at ambient temperature, wide electrochemical window, the ability to form SEI layer on electrodes, and the ability to passivate aluminum current collector from anodic dissolution (see Wang et al., *Int. J. Electrochem. Sci* 1:250 (2006)). Furthermore, LiBOB is stable to a temperature of 302° C. and at temperatures beyond this point it decomposes rather than melts into environmentally benign products. In contrast, the commonly used lithium salt, $LiPF_6$, generates toxic and corrosive products.

The polymer electrolyte may also comprise ceramic fillers such as silica and/or a metal oxide such as magnesium oxide, aluminum oxide, lithium aluminum oxide, or titanium dioxide.

The polymer electrolyte may also contain a room-temperature ionic liquids such as N-butyl-N-methylpyrrolidinium bistrifluorosulfonylimide, N-butyl-N-methylpyrrolidinium dicyanamide, 1-butyl-3-methylimidazolium dicyanamide, and 1-methyl-3-ethylimidazolium dicyanamide. In one embodiment, the room-temperature ionic liquid is based on a quaternary ammonium, 1-methyl-3-alkylimidazolium or N-methyl-N-alkylpyrrolidinium organic cation together with the dicyanamide anion.

The polymer solution may be cast into an apparatus containing a substrate and dried to produce a polymer film. In one embodiment, the apparatus is a Petri dish. In another embodiment, the substrate is a mold of fluorinated ethylene propylene coated aluminum sheets. The size and thickness of the film obtained in the casting method is optimized based on the capability, shape, size, and the like of the apparatus used. In one embodiment, the thickness of the resultant polymer electrolyte film is between about 10 to 300 μm. In another embodiment, the thickness of the resultant polymer electrolyte film is between about 200 to 250 μm.

The nanostructured thin-film battery electolyte of the present invention does not contain major proportions of non-conducting blocks that are frequently used to enhance the mechanical properties of the material, but do not contribute in any way to the ion transport of the conducting segments. Also due to its high charge density, lithium batteries using the solid electrolyte polymers of the present invention are expected to show high performance with a nominal voltage over 3.6 volts. The solid electrolyte polymers of the present invention circumvent the use of corrosive and flammable liquid based electrolytes and provides for the creation of safe and flexible energy sources. Furthermore, the solid electrolyte polymers of the present invention show potential for the design of ultrathin batteries as thin (if not thinner) than 0.4 mm. The solid electrolyte polymers of the present invention are more compatible with battery electrodes than conventional inorganic glass or ceramic electrolytes and should exhibit minimal capacity fade over 500 cycles and hence have longer performance life than conventional inorganic glass or ceramic electrolytes.

EXAMPLES

Lithiation of the Diblock Copolymer

The PEO-b-PMMA block copolymer was purchased from Polymer Source Inc. (Canada). The PEO-b-PMMA block copolymer had an average molecular weight 3000:500 of PEO to PMMA and had a polydispersity index of 1.16.

Hydrolysis was carried out using lithium hydroxide monohydrate ($LiOH.H_2O$) as the base in a molar ratio of 2:1 between $LiOH.H_2O$ and the MMA units of the diblock copolymer. The block copolymer (PEO-b-PMMA) and $LiOH.H_2O$ were dissolved in a 2:1 solvent mixture of anhydrous 1,4-dioxane and anhydrous methanol at 85° C. for 20 hours. The hydrolysis resulted in a random copolymer of methylmethacrylate (MMA) and lithium salt of methacrylic acid (MAALi). After hydrolysis, the solvent was removed under vacuum using a Schlenk line setup with a liquid nitrogen solvent vapor trap. The dried diblock copolymer PEO-b-(PMMA-ran-PMAALi) was then stored in a Mbraun Labmaster 100 argon glove box.

Figure 3:
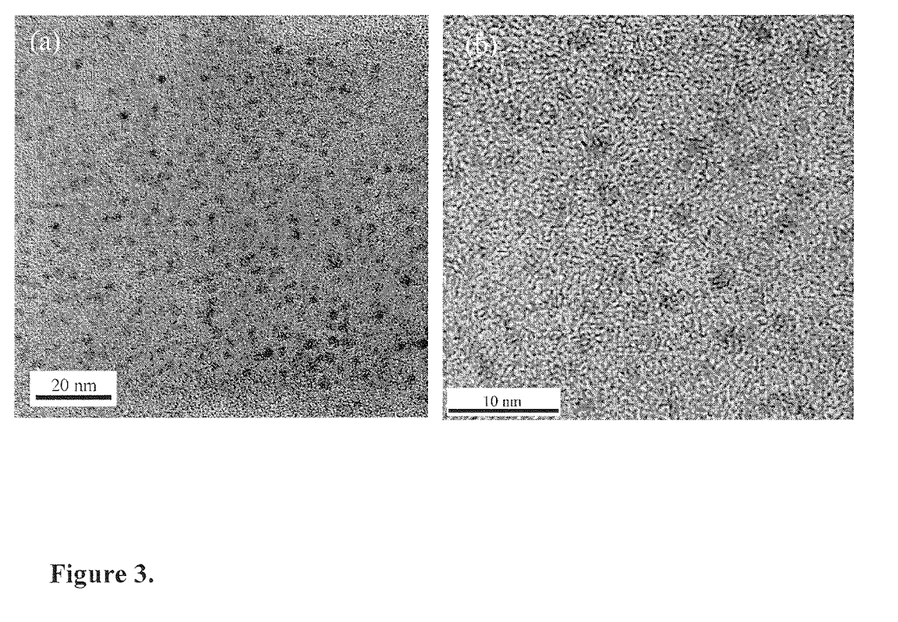
FIG. 3 is a transmission electron microscopy (TEM) image of a) the PEO-b-(PMMA-ran-PMAALi) diblock copolymer; and b) the PEO-b-(PMMA-ran-PMAALi) diblock copolymer at higher magnification showing lithium domains of approximately 2 nm in size.
Figure 4:
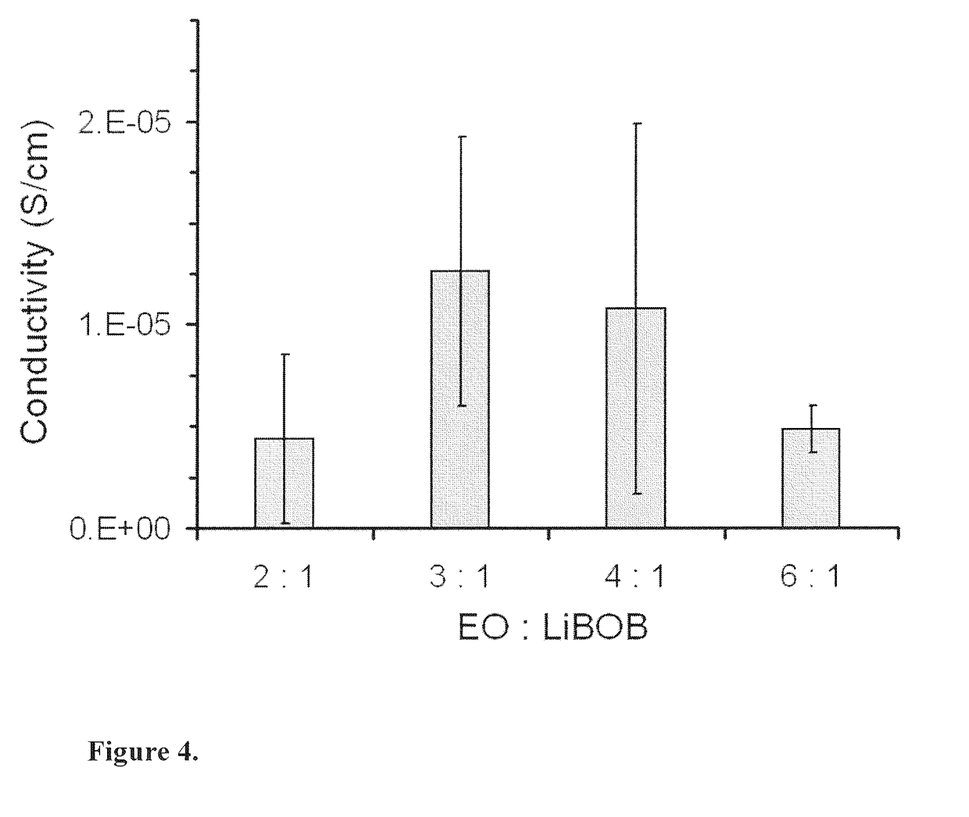
FIG. 4 is a graph of the salt optimization of PEO-b-(PMMA-ran-PMAALi) diblock copolymer at room temperature (21° C.).

It has been shown that PEO undergoes complexation with carboxylic acid groups (see Miyoshi et al., *Polymer* 37:11 (1996)). This complexation is driven by the proton-donating nature of poly(methacrylic acid) with PEO being a proton-acceptor. The complexation of PEO chains is a concern, as it would restrict the segmental motion that drives ion transport. In tailoring the electrolyte matrix, a very small fraction of the polymer contains lithium salt of carboxylic acid groups. In addition, the presence of ions from the added lithium salt acts as an effective screening barrier to subdue the complexation. The low carboxylic acid group content ensures that the block copolymer's microphase separation is not disrupted as confirmed by the TEM in FIG. 3. FIG. 3 shows that lithium domains of approximately 2 nm, templated by the diblock copolymer [PEO-b-(PMMA-ran-PMAALi)] morphology. Thus, the diblock copolymer acts as a polymer electrolyte, rather than a polymer electrolyte with ionomer-like cluster morphologies.

Preparation of Polymer Electrolyte Films

Solutions were prepared by adding varying concentrations of LiBOB salt to PEO-b-(PMMA-ran-PMAALi). Tetrahydrofuran (THF) was used as the solvent which had been degassed using multiple cycles of a freeze-pump-thaw method. The polymer solutions were then cast into petri-dishes containing molds of poly(tetrafluoroethylene) (PTFE)-coated aluminum sheets. The polymer solutions were dried over several days resulting in 200-250 µm thick polymer electrolyte films.

Conductivity Analysis

Circular sections of the polymer electrolyte films were cut and mounted between two 316 stainless stell blocking electrodes. A PTFE based O-ring was placed between the two electrodes to secure the sample thickness and surface area. The test assembly was sealed, protecting it from oxygen and humidity, before removal from the glovebox for impedance analysis. The ionic conductivity ($\sigma$) of the synthesized block copolymer electrolytes was determined from:

$$\sigma = t/RA$$

wherein t, A, and R represent the thickness, surface area, and ionic resistance, respectively, of the electrolyte sample. The assembled cell samples had a value of t/A of approximately 0.242 $cm^{-1}$. The ionic resistance of the dry polymer electrolytes was obtained from impedance studies of the test cells using the Solartron 1287A/55B electrochemical system. The testing parameters were controlled by the associated CorrWare and ZPlot softwares, while the resulting data was analyzed by ZView.

The diblock copolymer electrolyte exhibited an average ionic conductivity value of $1.26 \times 10^{-5}$ S/cm at room temperature (21° C.) as compared to $2.6 \times 10^{-6}$ S/cm measured for a PEO homopolymer of similar molecular weight (3.5 k) and molar composition of LiBOB. The value obtained for the diblock copolymer electrolyte is nearly two orders of magnitude greater than that shown by traditional high molecular weight PEO homopolymer electrolytes, in the absence of ceramic fillers and similar additives (see Croce et al., *Electrochim. Acta* 46:2457 (2001) and Scrosati et al., *J. Electrochem. Soc.* 147:1718 (2000)).

Temperature Studies

The performance of the electrolyte was studied in the temperature range 0-70° C. to characterize the temperature dependent behavior. Test cells were placed in a waterproof setup, immersed in a temperature controlled bath, and allowed 3-4 hours to equilibrate at every temperature stage before data collection. Results of the temperature studies can be seen in FIG. 5.

Figure 5:
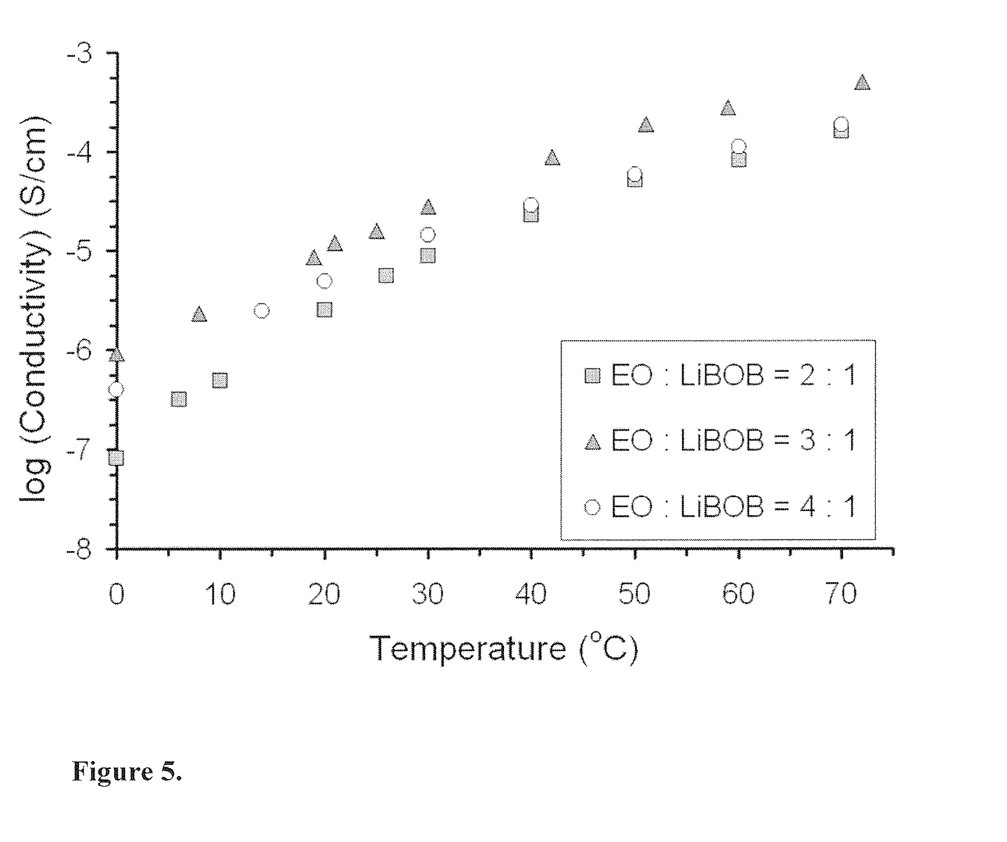
FIG. 5 is a graph of conductance measured in the temperature range of 0-70° C. for the PEO-b-(PMMA-ran-PMAALi) diblock copolymer.

The electrolyte membranes showed a rise in conductivity with temperature (see FIG. 5). This is attributed to the increased segmental motion of the chains as PEO approaches its melting point. The optimized electrolyte sample achieved a conductivity of $10^{-4}$ S/cm as the sample temperature crossed 40° C. The temperature characterization was halted at 70° C. which is above the melting point of PEO.

DSC Studies

Differential scanning calorimetry (DSC) measurements were performed using a TA Instruments Q100 calorimeter. Samples of ~10 to 14 mg of PEO and electrolyte films of diblock copolymer PEO-b-(PMMA-ran-PMAALi) with added LiBOB salt were sealed in hermetic aluminum pans inside the argon-filled glove box. The PEO homopolymer samples studied were of molecular weights 3.5 k, similar to that of the block copolymer. The measurements were carried out under nitrogen flow at a heating rate of 2.00° C./min and modulation of ±1.27° C. every 60 seconds, in the temperature range of 40-120° C. Glass transition temperature ($T_g$) studies were carried out by melting the samples sealed within the hermetic aluminum pans at 130° C. followed by quenching them under nitrogen flow at a heating rate of 5.00° C./min.

Figure 6:
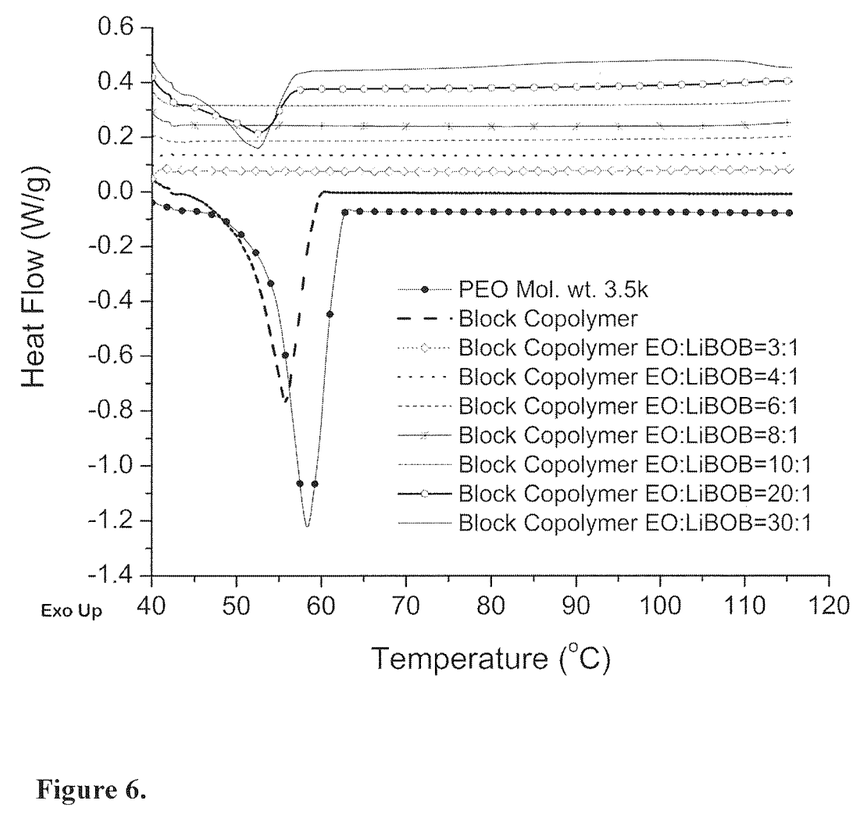
FIG. 6 is a graph of PEO-b-(PMMA-ran-PMAALi) diblock copolymer with different added compositions of LiBOB as compared to native PEO measured using differential scanning calorimetry (DSC).

DSC was performed to compare the initial crystallinity content in the polymer electrolytes. Scans of normalized heat flow (in watts per gram) against temperature (in degrees Celsius) are shown in FIG. 6. The pure block copolymer showed reduced crystallinity as compared to PEO of similar molecular weight. The plasticizing effect of LiBOB salt aided in suppressing the crystallinity of the polymer electrolyte. These materials exhibited a suppressed melting point over a broad temperature range. Crystalline domains were again shown to appear in low salt content (EO:LiBOB >20:1) samples, as the plasticizing presence of LiBOB was reduced. Upon exposure to air and moisture, these invented translucent films turned opaque and crumbled. This is in contrast to traditional liquid electrolytes which result in flammable and corrosive by-products.

TEM Studies 0.1% solutions of the diblock copolymer PEO-b-(PMMA-ran-PMAALi) were prepared in THF and cast on transmission electron microscopy (TEM) grids. The grids were placed in a THF-saturated dessicator to prolong the casting over a period of three days. No form of staining was used, with the image contrast coming from lithium. TEM was performed with a JOEL 2100F field emission scanning electron microscope operating at 100 kV.

$T_g$ Studies $T_g$ studies were carried out for the diblock copolymer electrolyte [PEO-b-(PMMA-ran-PMAALi)] with (EO:LiBOB=3:1) and without salt content and PEO homopolymer of similar molecular weight (3.5 k). No significant shift in $T_g$ was observed between the samples with PEO and PMMA-ran-PMAALi blocks showing glass transition temperatures at −25.9+1.5° C. and 103.5±1.4° C., respectively.

Having now fully described this invention, it will be understood by those of ordinary skill in the art that the same can be performed within a wide and equivalent range of conditions, formulations and other parameters without affecting the scope of the invention or any embodiment thereof. All patents, patent applications and publications cited herein are fully incorporated by reference herein in their entirety.

What is claimed is:

1. A solid polymer electrolyte comprising:
   a) a diblock copolymer comprising a poly(ethylene oxide) block and a random copolymer block of methylmethacrylate and lithium salt of methacrylic acid; and
   b) lithium bis(oxalate)borate.

2. The solid polymer electrolyte of claim 1, wherein the solid polymer electrolyte has reduced crystallinity compared to poly(ethylene oxide) of similar molecular weight.

3. The solid polymer electrolyte of claim 1, wherein the diblock copolymer is a PEO-b-PMMA block copolymer.

4. The solid polymer electrolyte of claim 3, wherein the molecular weight ratio of PEO to PMMA is 6:1.

5. The solid polymer electrolyte of claim 1, which is PEO-b-(PMMA-ran-PMAALi).

6. The solid polymer electrolyte of claim 1, wherein the molecular weight ratio of poly(ethylene oxide) block to lithium bis(oxalate)borate is between 2:1 to 6:1.

7. The solid polymer electrolyte of claim 1, wherein the lithium ions of the lithium salt of the diblock copolymer are incorporated within the microphase separated spherical domains of the methylmethacrylate block.

8. The solid polymer electrolyte of claim 1, wherein the electrolye does not contain major proportions of non-conducting blocks.

9. The solid polymer electrolyte of claim 1, wherein the molecular weight ratio of the poly(ethylene oxide) block to lithium bis(oxalate)borate is 3:1.

10. A battery comprising the solid polymer electrolyte of claim 1.

11. A method of producing the solid polymer electrolyte of claim 1 comprising:
    (a) hydrolyzing a solution of PEO-b-PMMA with lithium hydroxide in an organic solvent to give a diblock copolymer salt;
    (b) drying the diblock copolymer salt produced by a); and
    (c) dissolving said diblock copolymer salt in an organic solvent and adding lithium bis(oxalate to give a polymer solution.

12. The method of claim 11, wherein the solution in a) is produced by adding a mixture of 1,4-dioxane and methanol.

13. The method of claim 11, further comprising:
    d) casting the polymer solution of c) into a Petri dish containing fluorinated ethylene propylene coated aluminum sheets; and
    e) drying the polymer solution to produce a polymer electrolyte film.

* * * * *